(12) United States Patent
Grillos, II et al.

(10) Patent No.: US 12,392,242 B2
(45) Date of Patent: Aug. 19, 2025

(54) LUNAR WATER COLLECTION DEVICE

(71) Applicant: Blue Origin Manufacturing, LLC, Huntsville, AL (US)

(72) Inventors: Emmanuel John Grillos, II, Kent, OR (US); Brandon Block, Burien, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 519 days.

(21) Appl. No.: 17/815,825

(22) Filed: Jul. 28, 2022

(65) Prior Publication Data

US 2024/0035379 A1 Feb. 1, 2024

(51) Int. Cl.
E21C 51/00 (2006.01)
B64G 4/00 (2006.01)
C25B 1/04 (2021.01)

(52) U.S. Cl.
CPC .............. E21C 51/00 (2013.01); B64G 4/00 (2013.01); C25B 1/04 (2013.01)

(58) Field of Classification Search
CPC .............. B64G 4/00; C25B 1/04; E21C 51/00
See application file for complete search history.

(56) References Cited

U.S. PATENT DOCUMENTS

| 5,901,557 | A | 5/1999 | Grayson | |
| 6,591,867 | B2 | 7/2003 | Grayson | |
| 6,840,275 | B2 | 1/2005 | Grayson | |
| 9,581,021 | B2* | 2/2017 | Ethridge | H05B 6/702 |
| 11,905,833 | B2* | 2/2024 | Sowers, Jr. | F24S 21/00 |
| 12,091,973 | B1* | 9/2024 | Salvino | E21C 51/00 |
| 2012/0155966 | A1* | 6/2012 | Zillmer | B64G 4/00 |
| | | | | 405/128.85 |
| 2020/0240267 | A1* | 7/2020 | Sercel | E21C 51/00 |

OTHER PUBLICATIONS

Tanya Lewis, "Incredible Technology: How to Mine Water on Mars," Incredible Technology, Dec. 23, 2013, https://www.space.com/24052-incredible-tech-mining-mars-water.html.
Steve Roy, Marshall Space Flight Center News Releases, "Cooking Up Water From the Moon? NASA Studies Water Extraction With Microwaves" Oct. 19, 2009, https://www.nasa.gov/centers/marshall/news/news/releases/2009/09-083.html.

(Continued)

Primary Examiner — Janine M Kreck
(74) Attorney, Agent, or Firm — Summit Patents PC

(57) ABSTRACT

Techniques and systems extract water from lunar regolith using microwave radiation and may also produce fuel from the extracted water. The system can distill the extracted water to remove impurities before electrolyzing the purified water into oxygen and hydrogen gases, which may then be cooled to form liquid oxygen and liquid hydrogen. A portion of the system may reside on a lunar landing module. Another portion of the system may be affixed to a robotic arm that is extendable from the lunar landing module. This portion of the system includes a water extraction unit, comprising a cone used as a cold trap. The cone may include cooling channels to keep the temperature of the smooth inner surface of the cone cold enough to trap particles of frost that attach to the inner surface. The frost is then scraped from the inner surface and collected.

20 Claims, 3 Drawing Sheets

(56) References Cited

OTHER PUBLICATIONS

Stephen Hoffman et al., "Mining" Water Ice on Mars An Assessment of ISRU Options in Support of Future Human Missions, Jul. 2016.
Edwin Ethridge, Ph.D., "Using Microwaves for Extracting Water from the Moon," COMSOL Conference, Boston, MA, Oct. 9, 2009.
Eric E. Rice, "Development of Lunar Ice/Hydrogen Recovery System Architecture," Universities Space Research Association (USRA), Jan. 1, 2000.

* cited by examiner

LUNAR WATER COLLECTION DEVICE

BACKGROUND

Water is a valuable resource, particularly for space exploration, whether for human habitation or short term travel. For example, extraction of water from the moon could allow for human life support and propellant production on the moon. Water has been discovered to be in the lunar regolith. Simple and cost-effective extraction of water, and subsequent electrolyzing for fuel production, could enable the development of a fuel depot on the moon. The resulting fuel could have commercial, military, and scientific uses. The efficient extraction of water could permit the return of spacecrafts from various planetary bodies without having to launch the return fuel from Earth, with its larger gravity and launch fuel costs, for example.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
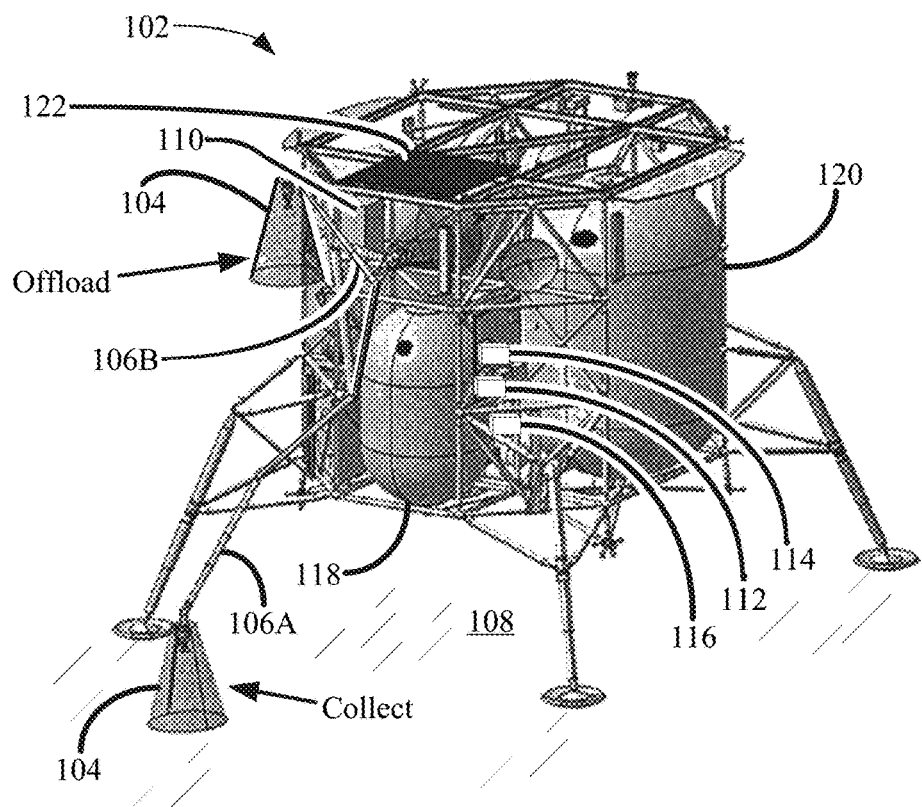
FIG. 1 is a view of a lunar landing module and an onboard lunar water collection apparatus, according to some embodiments.

This disclosure describes a number of techniques and systems for extracting water from lunar regolith, and also for producing fuel from the extracted water. In some embodiments, a system extracts water from lunar regions that are permanently shadowed, which is a condition that can permanently maintain water in its solid phase. The system can distill the extracted water (in the form of frost) to remove impurities before electrolyzing the purified water. At this stage, an electrolyzer separates most of the water into oxygen and hydrogen gases, which are then cooled to form liquid oxygen and liquid hydrogen. The system may reside on a lunar landing module. A portion of the system is affixed to the lunar landing module. This portion includes, for example, a distiller, an electrolyzer, cryocoolers, storage tanks, and a heat-exchanger radiator. Another portion of the system is affixed to the end of a robotic arm that is extendable from the lunar landing module. This portion of the system includes a water extraction unit, which may comprise a cone, at least a portion of which may be metallic (e.g., aluminum), that may be used as a cold trap. The cone may include channels to carry, for example, cold helium gas, providing cooling from a cryocooler to keep the temperature of the smooth inner surface of the cone cold enough to trap particles of frost that attach to the inner surface. The water extraction unit includes a microwave emitter to radiate the lunar regolith, thus leading to production of the frost.

The water extraction unit includes, inside the cone, a microwave radiator, scraper, and collection receptacle, all of which may be rotated by a motor. The rotation drives the scraper around the smooth inner surface of the cone, scraping off and collecting water-based frost into the collection receptacle.

In some embodiments, after the lunar landing module lands on the moon, the robotic arm removes the water extraction unit from the lunar landing module and places the water extraction unit on or over the lunar regolith. In some implementations, the robotic arm telescopes out from the lunar landing module to place the water extraction unit an adequate distance from any lunar regolith that may have been disturbed by the landing of the lunar landing module. When the collection receptacle is full of frost, the robotic arm may return the water extraction unit to the lunar landing module and place it in a position to deposit the frost into the distiller of the system.

Microwave radiation can penetrate into the lunar regolith, allowing for water removal from below the surface with collection performed above the surface. For example, the microwave radiation can heat frozen water dispersed in the regolith into water vapor, which rises to above the surface. The water vapor refreezes in the form of frost as it condenses on a cold surface of the water extraction unit (e.g., the inside surface of the cone). The water-based frost may then be scraped off and collected. In this way, water may be extracted without a need to dig or excavate the surface of the moon. The wavelength of the microwave radiation may be adjusted to optimize effectiveness based on electromagnetic properties of the regolith.

Extraction of water from the moon or other planetary bodies is desirable for human life support. Such extraction may also be important for producing fuel, such as rocket propellant. The Extracted water may be electrolyzed (e.g., using solar or nuclear energy) into hydrogen and oxygen gases, which may be stored and subsequently used with fuel cells for electrical energy or as a propulsion fuel subsequent to liquifying the gases.

In particular embodiments, an apparatus for collecting and processing water from lunar regolith may comprise a robotic arm and a water extraction unit attached to the robotic arm. The other end of the robotic arm may be attached and at least partially energized and/or operated from a lunar landing module. The water extraction unit may include a collection cone having a wall, an apex, a smooth inside surface, an outside surface, and an open base. There may be cooling channels in the wall or on the outside surface of the collection cone. A scraper arm may be in contact with the inside surface of the collection cone and may be configured to remove water-based frost accumulated on the inside surface of the cone by scraping. A collection receptacle may be configured to receive the water-based frost scraped from the inside surface of the cone. A microwave emitter may be at or near the apex of the collection cone and may be configured to beam microwave radiation into lunar regolith through the open base of the collection cone. A motor in or on the collection cone may move the scraper arm peripherally around the inside surface of the collection cone so that substantially all of the smooth inside surface of the collection cone can be scraped by the scraper arm. In some implementations, the motor may be configured to also rotate the microwave emitter so as to change polarization of the microwave radiation that is transmitted across the open base of the collection cone and into the lunar regolith.

In some implementations, the scraper arm may include a collection tray configured to collect and transport, by gravity, the water-based frost scraped from the inside surface of the cone to the collection receptacle. The scraper arm, the collection tray, and the collection receptacle may form a single contiguous unit.

In addition to the robotic arm and the water extraction unit, the apparatus for collecting and processing water from the lunar regolith may also comprise a processing system that includes a distiller configured to receive, and to substantially remove impurities from, the water-based frost scraped from the inside surface so as to produce water. The processing system may further include an electrolyzer configured to receive the water from the distiller and to produce gaseous oxygen and gaseous hydrogen by electrolysis of the water. The processing system may further include a cryocooler to receive the gaseous oxygen from the electrolyzer and to cause a phase change from the gaseous oxygen to liquid oxygen, a second cryocooler to receive the gaseous hydrogen from the electrolyzer and to cause a phase change from the gaseous hydrogen to liquid hydrogen, and respective tanks to receive and store the liquid oxygen and liquid hydrogen. A radiator may be functionally connected to each of the cryocoolers and may exhaust heat collected by the cryocoolers. The radiator may also be functionally connected to the cooling channels of the collection cone.

In various embodiments, the robotic arm may be configured to operate in a collection configuration and an offload configuration. In the collection configuration, the collection cone is placed on the lunar regolith. In the offload configuration, the collection cone is positioned over a receiving portion of the distiller so as to provide the water-based frost to the distiller.

FIG. 1 is a view of a lunar landing module 102 and an onboard lunar water collection apparatus, parts of which are located in various portions of the lunar landing module, according to some embodiments. For example. the lunar water collection apparatus includes a water extraction unit 104 located at or near the end of a robotic arm 106 (either 106A or 106B, as explained below). The water extraction unit and the robotic arm may be configured to operate in a collection configuration or an offload configuration. For example, in the collection configuration, which is illustrated in FIG. 1 and labelled "Collect", the robotic arm, in position 106A, places collection cone 104 on lunar regolith 108. This configuration allows the collection cone to collect water-based frost from the lunar surface. In the offload configuration, which is illustrated in FIG. 1 and labelled "Offload", the robotic arm, in position 106B, places collection cone 104 over a receiving portion (e.g., a hopper) of a distiller 110, so as to provide the water-based frost to the distiller.

The apparatus for collecting and processing water from the lunar regolith may also comprise a processing system that includes distiller 110, an electrolyzer 112, an oxygen cryocooler 114, a hydrogen cryocooler 116, an oxygen tank 118, a hydrogen tank 120, and a radiator 122. Distiller 110 may be located on lunar landing module 102 so that a receiver portion, such as a hopper or other type of input port, can receive water-based frost offloaded from water extraction unit 104 (e.g., when robotic arm is in an offload configuration 106B). Distiller 110 may substantially remove impurities from the water-based frost to produce water that is in turn provided to electrolyzer 112, which may produce gaseous oxygen and gaseous hydrogen by electrolysis of the water. Oxygen cryocooler 114 receives the gaseous oxygen from the electrolyzer and causes a phase change from the gaseous oxygen to liquid oxygen, which may then be stored in oxygen tank 118. Hydrogen cryocooler 116 receives the hydrogen oxygen from the electrolyzer and causes a phase change from the gaseous hydrogen to liquid hydrogen, which may then be stored in hydrogen tank 120. Radiator 122 may be functionally connected to each of cryocoolers 114 and 116 and may exhaust heat collected by the cryocoolers. Radiator 122 may also be functionally connected to the cooling channels of collection cone 104, as described below.

Figure 2:
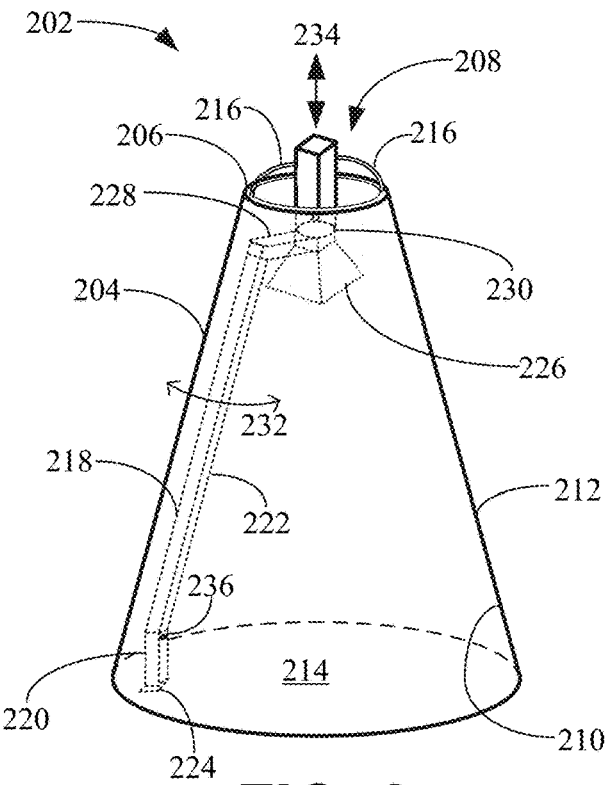
FIG. 2 is a schematic perspective view of a water extraction unit, according to some embodiments.

FIG. 2 is a schematic perspective view of a water extraction unit 202, which may be the same as or similar to 104, according to some embodiments. Water extraction unit 202 comprises a collection cone 204 that includes a wall 206, an apex 208, an inside surface 210, an outside surface 212, and an open base 214. The conical shape of collection cone 204 allows for efficient trapping of microwave-heated water vapor escaping from the underlying regolith. Microwave radiation emitted from a top portion of the collection cone, as described below, may have a conical-shaped beam.

Cooling channels 216 may be located at least partially in wall 206 or on outside surface 212 of the collection cone. The cooling channels in or on wall 206 are not explicitly illustrated in FIG. 2 for sake of visual clarity. A scraper arm 218 may be in contact with inside surface 210 of the collection cone and configured to remove water-based frost accumulated on the inside surface of the cone by scraping. A collection receptacle 220 may be located at or near a bottom portion of scraper arm 218 to receive the water-based frost scraped from the inside surface of the cone. The scraper arm may further include a collection tray 222 configured to collect and transport, by gravity, the water-based frost scraped from the inside surface of the cone to collection receptacle 220. In some implementations, an offloading portal 224 of collection receptacle 220 may be configured to remain closed to retain collected water-based frost in the collection receptacle and to open to offload the water-based frost when the collection receptacle is in a position to transfer the water-based frost to distiller 110.

A microwave emitter 226 may be at or near apex 208 of collection cone 204 and configured to beam microwave radiation through open base 214 of the collection cone and into underlying regolith. Microwave radiation may be in a range of about 0.9 to 5.8 GHz, though other frequencies are possible. Scraper arm 218 may be attached via an arm 228 to a motor 230 (e.g., and associated gears or other mechanics) to move the scraper arm peripherally around the inside surface of the collection cone. Such motion is indicated by arrow 232. In this way, the scraper arm can scrape substantially the entire inside surface 210 of the cone to scrape off any water-based frost that may have accumulated thereon from microwave-heated water dispersed in the regolith. The rate of rotation may be varied and set to a value based on, for example, the accumulation rate of the water-based frost. Being interconnected, scraper arm 218, collection tray 222, and collection receptacle 224 may all move together around the inside surface of the collection cone.

An interface connection 234 between water extraction unit 202 and a robotic arm (e.g., 106), in addition to mechanical attachment (not illustrated) and cooling lines to cooling channels 216, may include wires or cables to carry electrical power to motor 230, microwave emitter 226, and offloading portal 224. In some implementations, collection receptacle 220 may include a sensor 236 to sense the quantity of collected water-based frost. Interface connection 234 may include a wire or cable to carry electrical signals generated by sensor 236 to the lunar landing module. If the sensor indicates that collection receptacle 220 is full, the robotic arm may move water extraction unit 202 from a collection configuration to an offload configuration, as explained above, where the contents of the collection receptacle can be emptied into a distiller (e.g., 110).

Microwave emitter 226 may also be attached to motor 228 (e.g., or a rotating portion thereof) to rotate the microwave emitter about an axis of collection cone 204. Such rotation may change the direction of polarization of the microwave radiation transmitted across open base 214 of the collection cone. Cyclically or periodically changing the polarization may allow for improved penetration of the microwave radiation into the lunar regolith for at least the reason that grain size and shape, chemical composition, and distribution of the minerals and other portions of the regolith may generally affect the behavior (e.g., transmission, dispersion, heating efficacy, etc.) of the microwave radiation based, at least on part, on its polarization.

Figure 3:
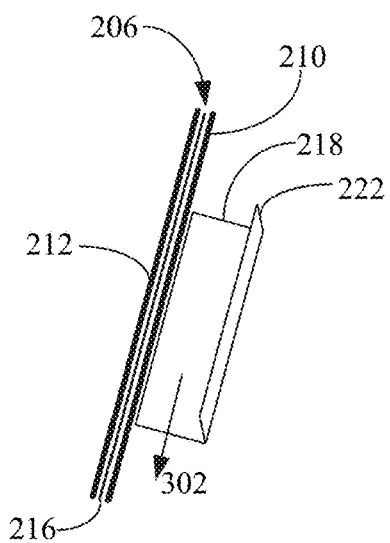
FIG. 3 is a schematic perspective view of a portion of a scraper arm and collection tray, according to some embodiments.

FIG. 3 is a schematic perspective view of scraper arm 218 and collection tray 222, according to some embodiments. FIG. 3 also illustrates a cross-section of wall 206 and reveals a portion of cooling channels 216 inside the wall. In other embodiments, cooling channels 216 may be attached to outside surface 212 of the wall.

Scraper arm 218, in contact with inner surface 210 of the collection cone, is illustrated for clarity as having a relatively shorter length than the inner surface. The length of scraper arm 218 and collection tray 222, however, may be a length sufficient for scraping substantially the entire inner surface 210. Collection tray 222 may comprise a wall that uses gravity to guide the water-based frost downward in a direction 302 and into collection receptacle 220. Scraper arm 218 and collection tray 222 may be formed from a single sheet of material and, in some embodiments, the edge of the scraper arm, which contacts inner surface 210, may be fitted with a material (e.g., an edging) that is well-suited for scraping frost from a surface. For example, sharpness, edge-shape, and resistance to erosion may be design factors for considering materials and design of the edge of the scraper arm. Scraper arm 218, collection tray 222, and collection receptacle 220 may form a single contiguous unit. Widths of the scraper arm and collection tray illustrated in FIG. 3 are merely examples, and claimed subject matter is not limited in this respect.

Figure 4:
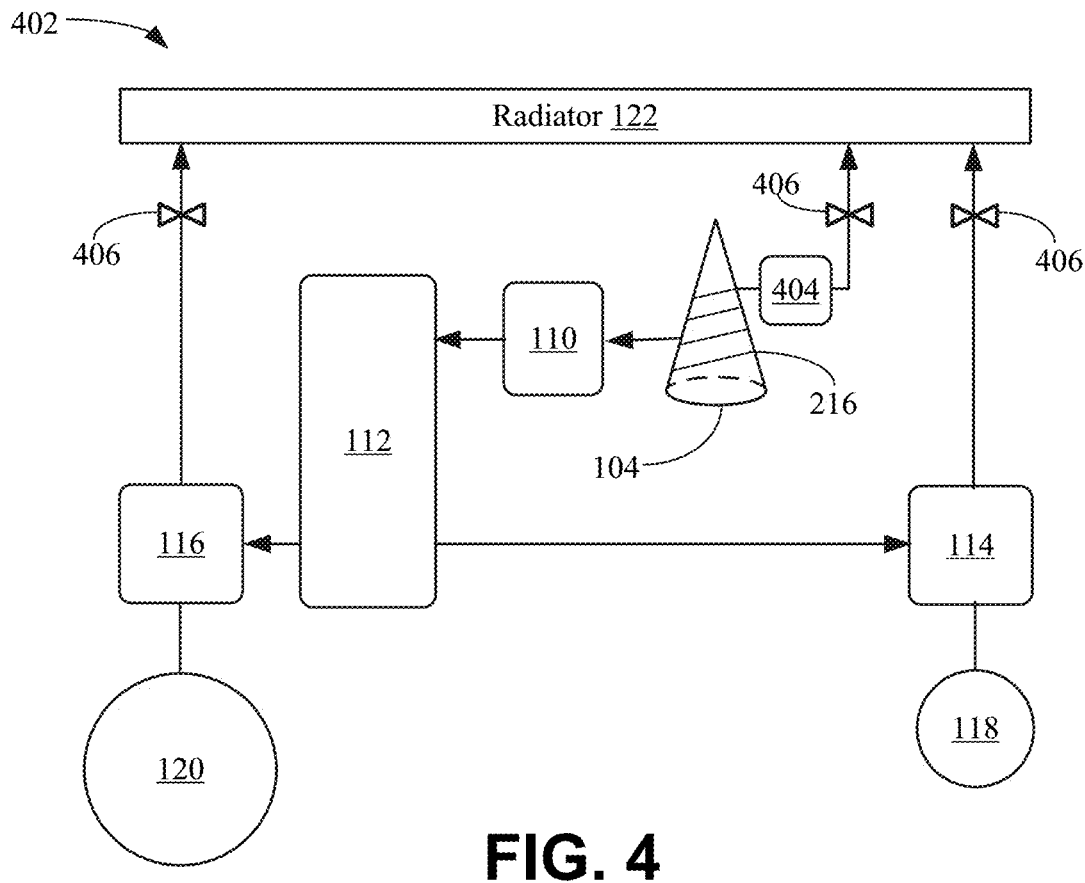
FIG. 4 is a block diagram of an apparatus for collecting and processing water from lunar regolith, according to some embodiments.

FIG. 4 is a block diagram of an apparatus 402 for collecting and processing water from lunar regolith, according to some embodiments. Apparatus 402 may be the same as or similar to the onboard lunar water collection apparatus illustrated in FIG. 1, as in this example. Apparatus 402 includes water extraction unit 104 located at or near the end of a robotic arm (e.g., 106A or 106B). The water extraction unit and the robotic arm may be configured to operate in a collection configuration or an offload configuration, as described above. The robotic arm, when in position 106B, places collection cone 104 over a receiving portion (e.g., a hopper) of distiller 110, so as to provide the water-based frost to the distiller.

The processing system of apparatus 402 includes electrolyzer 112, oxygen cryocooler 114, hydrogen cryocooler 116, oxygen tank 118, hydrogen tank 120, and radiator 122. As described above, distiller 110 may substantially remove impurities from water-based frost scraped from inside surface 210 (FIG. 2) to produce water that is in turn provided to electrolyzer 112, which may produce gaseous oxygen and gaseous hydrogen by electrolysis of the water. Oxygen cryocooler 114 receives the gaseous oxygen from the electrolyzer and causes a phase change from the gaseous oxygen to liquid oxygen, which may then be stored in oxygen tank 118. Hydrogen cryocooler 116 receives the hydrogen oxygen from the electrolyzer and causes a phase change from the gaseous hydrogen to liquid hydrogen, which may then be stored in hydrogen tank 120. Radiator 122, which exhausts heat collected by the cryocoolers, may be functionally connected to each of cryocoolers 114, 116, and a cryocooler 404 for cooling channels 216 of collection cone 104. Valves 406 may at least partially control flows of coolant for each of the cryocoolers and cooling channels 216.

Figure 5:
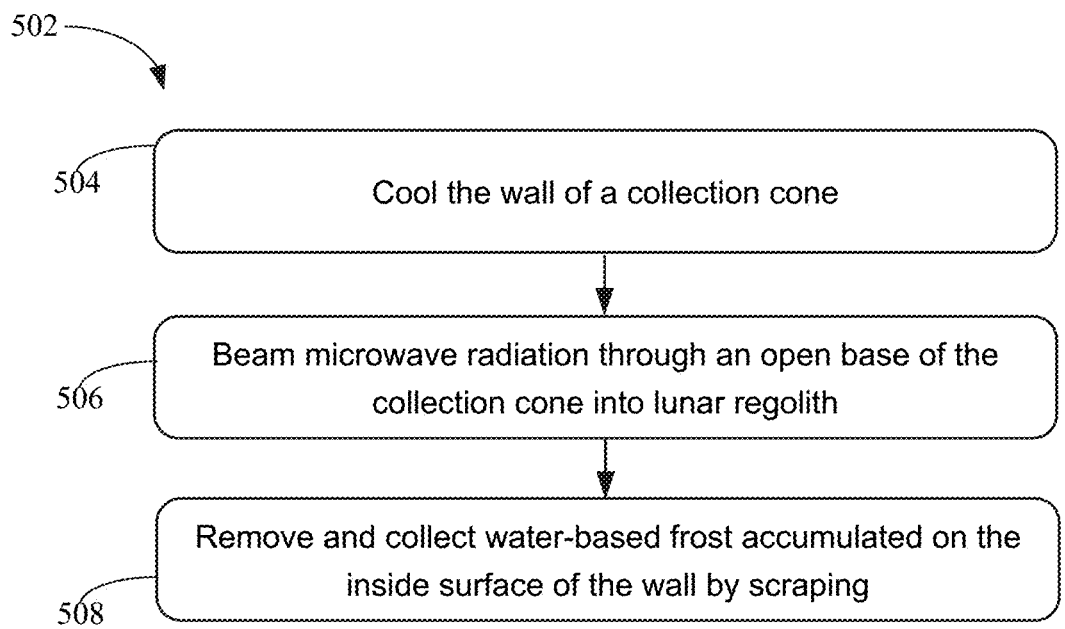
FIG. 5 is a flow diagram of a process for operating a water extraction unit, according to some embodiments.

FIG. 5 is a flow diagram of a process 502 for operating a water extraction unit, according to some embodiments. For example, an operator, which may be a person, an electronic controller, or a computer processing system, may perform process 502 using water extraction unit 202. Process 502 may be performed in a collection configuration (e.g., 106A), described above, when water extraction unit 202 is placed on or near lunar regolith. At 504, the operator may cool wall 206 of collection cone 204 by circulating coolant through cooling channels 216. At 506, the operator, using microwave emitter 226, may beam microwave radiation through open base 214 of the collection cone into lunar regolith (e.g., 108). The microwave radiation can penetrate into the lunar regolith and heat frozen water dispersed in the regolith, converting the frozen water into water vapor, which rises to above the surface of the regolith. The water vapor generally rises away from the regolith surface and refreezes in the form of frost as it condenses on the cold inner surface 210 of wall 206. At 508, the operator may remove and collect the water-based frost accumulated on the inside surface of the wall by scraping, as described above.

Figure 6:
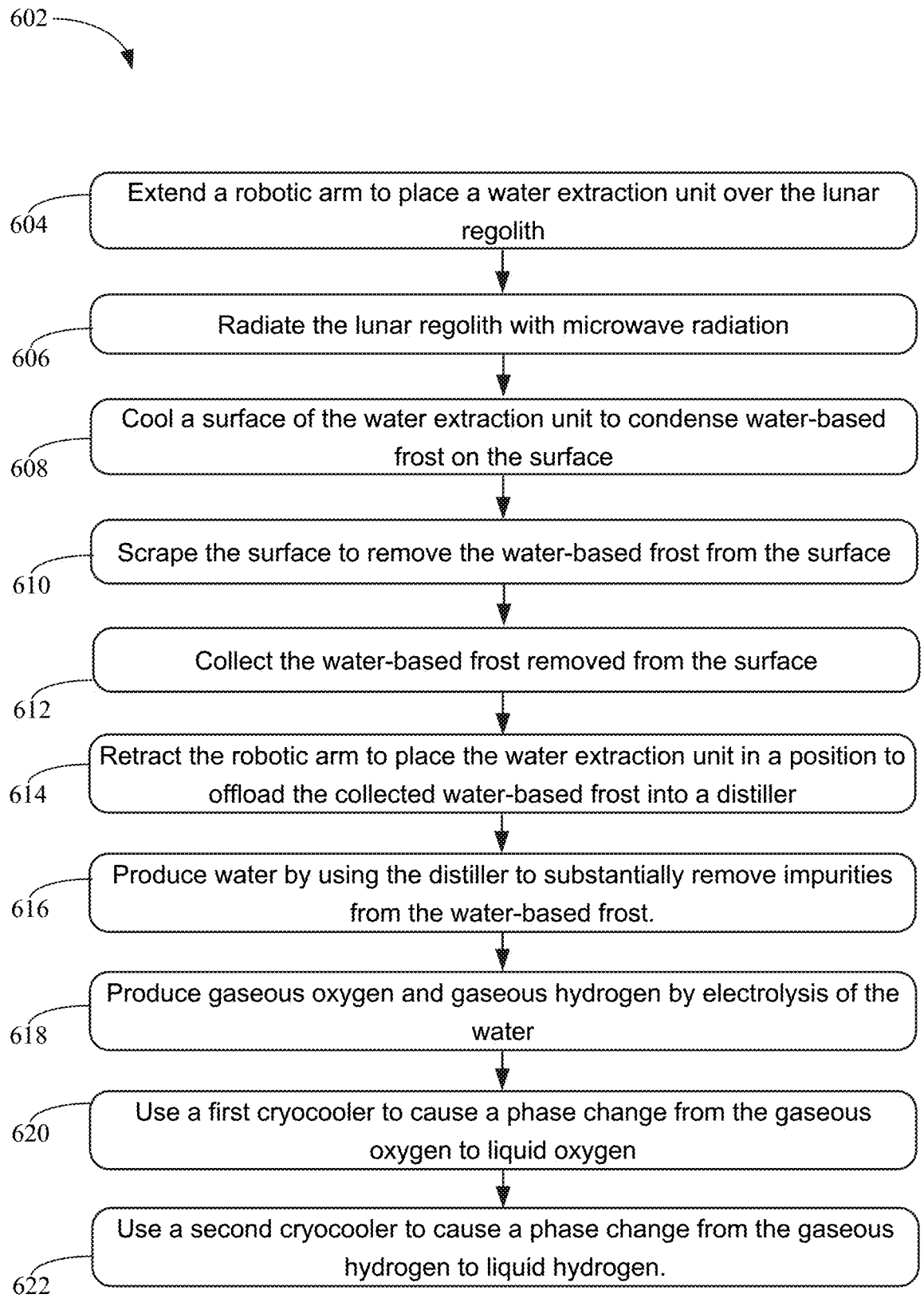
FIG. 6 is a flow diagram of a process for extracting water from lunar regolith and producing liquid oxygen and liquid hydrogen, according to some embodiments.

FIG. 6 is a flow diagram of a process 602 for extracting water from lunar regolith and producing liquid oxygen and liquid hydrogen, according to some embodiments. For example, an operator, which may be a person, an electronic controller, or a computer processing system, may perform process 602 using water extraction unit 202. At 604, the operator may extend a robotic arm to place water extraction unit 202 over the lunar regolith, as in a collection configuration (e.g., 106A), described above. At 606 and 608, the operator may radiate the lunar regolith with microwave radiation and cool surface 210 of the water extraction unit to condense water-based frost on the surface, as at 504 and 506 of process 502, for example. At 610, the operator may scrape surface 210, using scraper arm 218, for example, to remove the water-based frost from the surface, as at 508 of process 502. At 612, the operator may collect, using collection tray 222 and collection receptacle 220, the water-based frost removed from surface 210. At 614, the operator may retract the robotic arm to an offload configuration (e.g., 106B) thereby placing the water extraction unit in a position to offload the collected water-based frost into a distiller, such as 110. At 616, the operator may produce water by using the distiller to substantially remove impurities from the water-based frost. At 618, the operator may use electrolyzer 112 to produce gaseous oxygen and gaseous hydrogen by electrolysis of the water. At 620, the operator may use a first cryocooler, such as 114, to cause a phase change from the gaseous oxygen to liquid oxygen. At 622, the operator may use a second cryocooler, such as 116 to cause a phase change from the gaseous hydrogen to liquid hydrogen. The liquid oxygen and liquid hydrogen may then be stored in tanks 118 and 120, respectively, as described above The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. An apparatus for collecting and processing water from lunar regolith, the apparatus comprising:
   a robotic arm; and
   a water extraction unit attached to the robotic arm, wherein the water extraction unit includes:
      a collection cone comprising a wall, an apex, an inside surface, an outside surface, and an open base;
      cooling channels in the wall or on the outside surface of the collection cone;
      a scraper arm in contact with the inside surface of the collection cone and configured to remove water-based frost accumulated on the inside surface of the cone by scraping;
      a collection receptacle configured to receive the water-based frost scraped from the inside surface of the cone; and
      a microwave emitter at or near the apex of the collection cone and configured to beam microwave radiation through the open base of the collection cone.

2. The apparatus of claim 1, wherein the collection cone further comprises a motor configured to move the scraper arm peripherally around the inside surface of the collection cone.

3. The apparatus of claim 2, wherein the microwave emitter is configured to rotate by the motor so as to change polarization of the microwave radiation transmitted across the open base of the collection cone.

4. The apparatus of claim 1, wherein the scraper arm further comprises a collection tray configured to collect and transport, by gravity, the water-based frost scraped from the inside surface of the cone to the collection receptacle.

5. The apparatus of claim 4, wherein the scraper arm, the collection tray, and the collection receptacle form a single contiguous unit.

6. The apparatus of claim 1, further comprising a processing system that includes a distiller configured to receive, and to substantially remove impurities from, the water-based frost scraped from the inside surface to produce water.

7. The apparatus of claim 6, wherein the processing system further comprises an electrolyzer configured to receive the water from the distiller and to produce gaseous oxygen and gaseous hydrogen by electrolysis of the water.

8. The apparatus of claim 7, wherein the processing system further comprises:
   a first cryocooler to receive the gaseous oxygen from the electrolyzer and to cause a phase change from the gaseous oxygen to liquid oxygen;
   a first tank to receive and to contain the liquid oxygen;
   a second cryocooler to receive the gaseous hydrogen from the electrolyzer and to cause a phase change from the gaseous hydrogen to liquid hydrogen; and
   a second tank to receive and to contain the liquid hydrogen.

9. The apparatus of claim 8, wherein the processing system further comprises a radiator functionally connected to the first cryocooler and the second cryocooler, the radiator configured to exhaust heat collected by the first cryocooler and the second cryocooler.

10. The apparatus of claim 9, wherein the radiator is functionally connected to the cooling channels of the collection cone.

11. The apparatus of claim 6, wherein the robotic arm is configured to operate in a collection configuration and an offload configuration, wherein
   in the collection configuration, the collection cone is placed on the lunar regolith, and
   in the offload configuration, the collection cone is positioned over a receiving portion of the distiller so as to provide the water-based frost to the distiller.

12. The apparatus of claim 6, wherein the processing system and the robotic arm are attached to a lunar landing vehicle.

13. A lunar landing vehicle comprising:
   a robotic arm attached at a first end to the lunar landing vehicle;
   a water extraction unit attached to a second end, opposite the first end, of the robotic arm, wherein the water extraction unit includes
      a scraper arm in contact with a surface of the water extraction unit and configured to remove water-based frost accumulated on the surface by scraping,
      a collection receptacle configured to receive the water-based frost scraped from the surface, and
      a microwave emitter configured to beam microwave radiation into an area of lunar surface below the water extraction unit; and
   a lunar water processing system that includes
      a distiller configured to receive, and to substantially remove impurities from, the water-based frost scraped from the surface of the water extraction unit to produce water; and
      an electrolyzer configured to receive the water from the distiller and to produce gaseous oxygen and gaseous hydrogen by electrolysis of the water.

14. The lunar landing vehicle of claim 13, further comprising:
   a first cryocooler to receive the gaseous oxygen from the electrolyzer and to cause a phase change from the gaseous oxygen to liquid oxygen;
   a first tank to receive and to contain the liquid oxygen;
   a second cryocooler to receive the gaseous hydrogen from the electrolyzer and to cause a phase change from the gaseous hydrogen to liquid hydrogen; and
   a second tank to receive and to contain the liquid hydrogen.

15. The lunar landing vehicle of claim 13, wherein the water extraction unit further includes
   a collection cone comprising a wall, an inside surface, and an outside surface, wherein the scraper arm is in contact with the inside surface of the collection cone,
   cooling channels in the wall or on the outside surface of the collection cone, and
   a motor configured to move the scraper arm peripherally around the inside surface of the collection cone.

16. The lunar landing vehicle of claim 15, wherein the motor is configured to rotate the microwave emitter so as to change polarization of the microwave radiation over the area of lunar surface below the water extraction unit.

17. A method for extracting water from lunar regolith, the method comprising:

extending a robotic arm to place a water extraction unit over the lunar regolith;

radiating the lunar regolith with microwave radiation;

cooling a surface of the water extraction unit to condense water-based frost on the surface;

scraping the surface of the water extraction unit to remove the water-based frost from the surface of the water extraction unit;

collecting the water-based frost removed from the surface of the water extraction unit;

retracting the robotic arm to place the water extraction unit in a position to offload the collected water-based frost into a distiller; and producing water by using the distiller to substantially remove impurities from the water-based frost.

18. The method of claim 17, further comprising producing gaseous oxygen and gaseous hydrogen by electrolysis of the water.

19. The method of claim 18, further comprising:

using a first cryocooler to cause a phase change from the gaseous oxygen to liquid oxygen; and using a second cryocooler to cause a phase change from the gaseous hydrogen to liquid hydrogen.

20. The method of claim 19, further comprising using a single radiator that is functionally connected to the first cryocooler and the second cryocooler to exhaust heat collected by the first cryocooler and the second cryocooler.

\* \* \* \* \*